Figure 1:
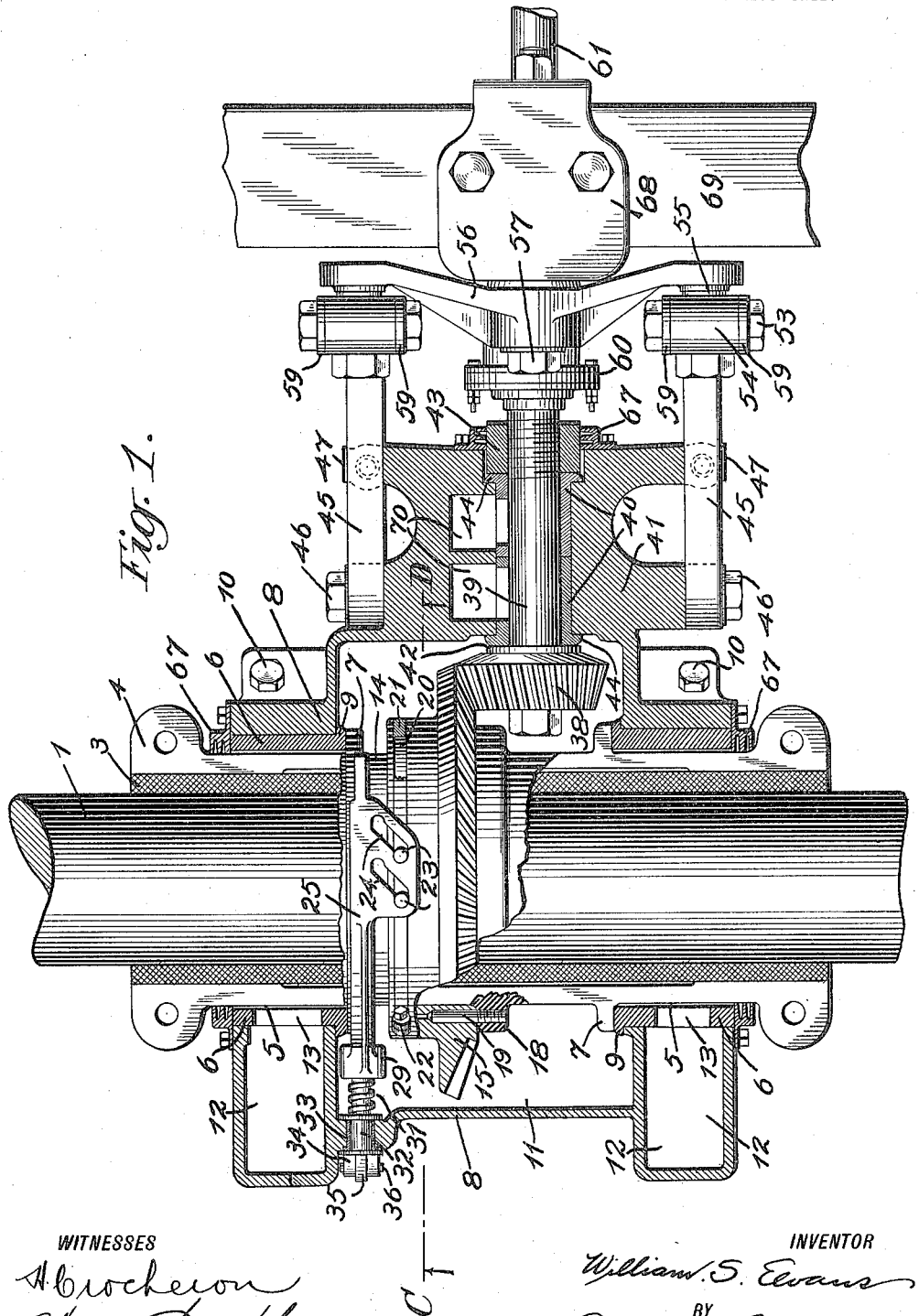

W. S. EVANS.
POWER TRANSMISSION MECHANISM.
APPLICATION FILED APR. 5, 1912.

1,158,468.

Patented Nov. 2, 1915.
2 SHEETS—SHEET 1.

WITNESSES

INVENTOR
William S. Evans
BY
ATTORNEY

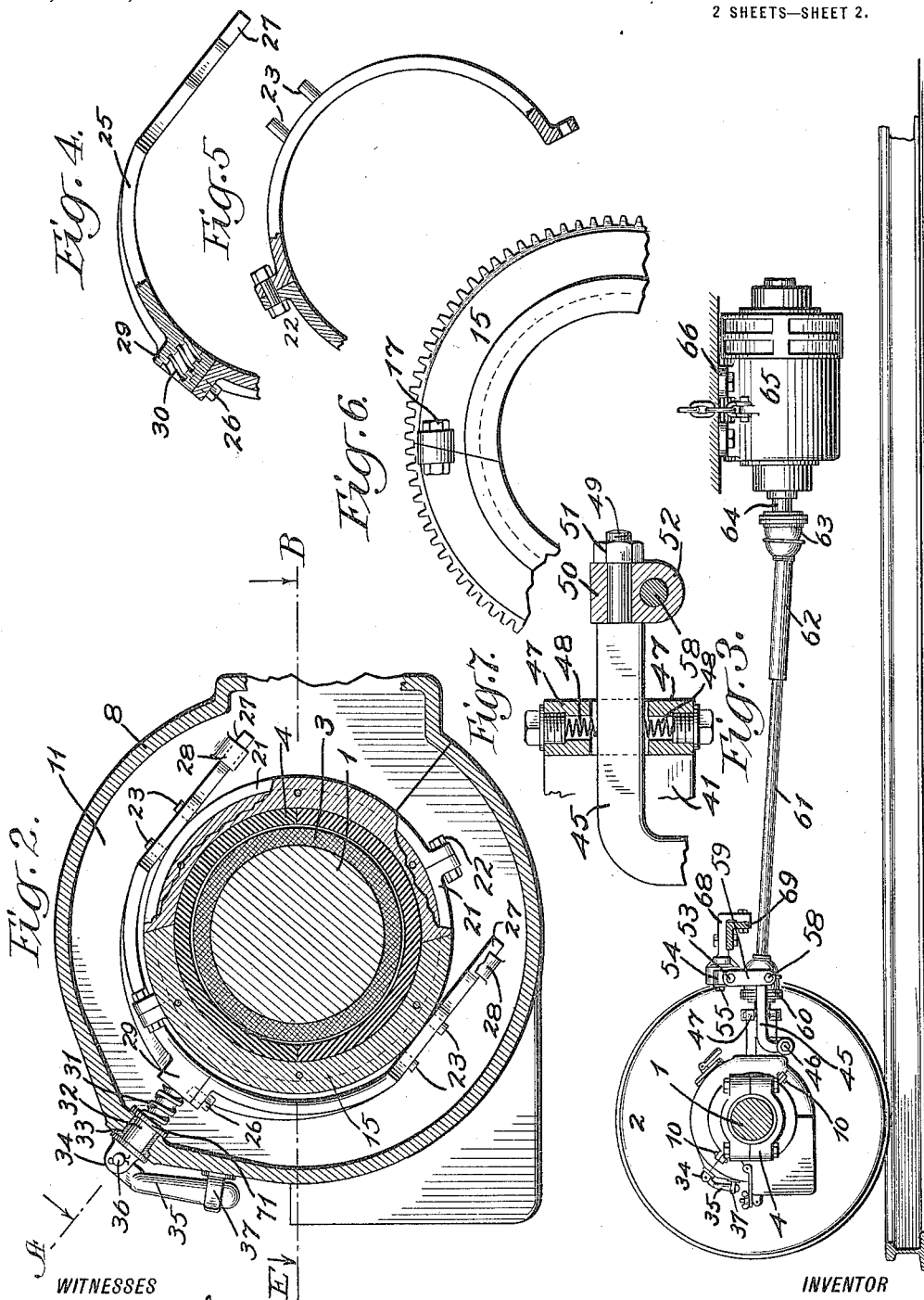

UNITED STATES PATENT OFFICE.

WILLIAM S. EVANS, OF NEW YORK, N. Y., ASSIGNOR TO THE SAFETY CAR HEATING & LIGHTING COMPANY, A CORPORATION OF NEW JERSEY.

POWER-TRANSMISSION MECHANISM.

1,158,468.　　　　　Specification of Letters Patent.　　Patented Nov. 2, 1915.

Application filed April 5, 1912. Serial No. 688,644.

*To all whom it may concern:*

Be it known that I, WILLIAM S. EVANS, a subject of the King of Great Britain, residing in New York, county of New York, and State of New York, have invented new and useful Improvements in Power-Transmission Mechanism, of which the following is a description.

My invention pertains to that class of transmission mechanism wherein it is desired to drive any mechanism, such as a dynamo electric machine or generator by means of a gearing connection with a driving member.

My invention has for its principal object to provide mechanism which will transmit and utilize power from either end of a train of gearing.

As my invention is particularly applicable to that class of driving mechanism wherein the dynamo or generator is carried by a car and driven by one of the revolving axles thereof, it will be described with reference to such an application.

Figure 1 is a partial top plan and section of a portion of a driving gearing embodying my invention, said section being taken partly on the line A—B and partly on the line E—B of Fig. 2. Fig. 2 is a transverse section and partial elevation of a portion of the mechanism shown in Fig. 1. Fig. 3 is a side elevation of my complete driving mechanism showing one form of the same as applied in practice, said figure being made on a smaller scale. Fig. 4 is a partial section and partial elevation of a portion of a yoke used in the construction of one type of driving gearing embodying my invention. Fig. 5 is a partial elevation and partial section of a portion of that embodiment of my invention illustrated in Figs. 1 and 2. Fig. 6 is an elevation of a portion of the main gearing shown in Fig. 1. Fig. 7 is a partial side elevation and partial section of a portion of the structure shown in Figs. 1 and 3.

In the drawings, 1 represents a rotatable shaft as the axle of an ordinary car revolving as is usual with the wheel 2 thereof.

3 is a soft metal sleeve cast about the axle and fixed thereupon, preferably of Babbitt metal, turned and trued to accurately fit the internal bore of the split member or sleeve 4, preferably made in halves and clamped thereupon so as to firmly engage the axle and revolve therewith. This sleeve 4 has the bearing portions 5 accurately turned to size and upon these are fitted the split bearings of bronze or other suitable bearing material indicated at 6, which are held from motion toward each other by the flanges 7 upon the sleeve 4. A split casing 8, portions of which are united as by the lugs and bolts indicated at 10, is carried upon the bearing members 6, the said casing being bored to properly fit upon the said bearing members 6 and engage the flanges 9 of the said bearing members and prevent movement of the same in a direction away from each other, and thus the position of the casing is determined by the position of the flanges 7 of the sleeve 4. The casing 8 is formed with an internal cavity 11 for containing the driving gearing, and in practice is filled with grease or heavy oil to keep the gearing lubricated. The casing is also provided with oil reservoirs 12, which are preferably filled with packing or waste which when soaked with oil, keeps the bearings 5—6 well lubricated through the openings 13. Sleeve 4 is provided as with the portion 14 accurately turned to receive the split bevel gear 15, the halves of which are bolted together as by the lugs and bolts indicated at 17 (see Fig. 6), the bore of the said gear being such that the same is free to move upon the portion 14 in a lateral direction. The member 4 is provided with a flanged portion 18 against which the gear is pressed when in its operative position. The flange 18 is provided with a series of pins 19 engaging holes bored in the gear 15 which freely allow the gear to move in a lateral direction, while the pins restrain the revolution of the gear about the sleeve and cause the same to be driven therewith. The hub of the gear 15 is provided with an annular recess 20 into which is fitted a split ring 21 united as by the lugs and bolts indicated at 22. This ring allows the gear to revolve freely within the same and is provided with the pins 23 arranged upon opposite sides of said ring. These pins engage the cam slots 24 of the yoke members 25, preferably made in two parts and united as by screws 26. This yoke has its extremities 27 supported as by passing through the openings in the lugs 28 cast upon one of the side walls of the casing 8. The center of the yoke is provided with a boss 29, having an internal thread 30 (see Fig. 4) which engages the screw 31, carried by the shaft 32, fitted into a bushing 33, carried by the shell 8. The shaft 32 is free to revolve within the bushing but is restrained from moving in any other direction as indicated. This shaft 32 is provided with a head 34, having hinged thereto the handle 35 as by means of pin 36.

37 is a spring clamp carried upon the shell 8 between the jaws of which the handle 35 may be pressed and held from revolution. With the yoke 25 in the position shown in the drawings, the cam slots 24 force the pins 23 into the positions indicated in Fig. 1 and the gear 15 is then held against the flange 18 as shown in the said figure. In this position the gear 15 is meshed with a bevel pinion 38 carried upon a shaft 39, supported within the bearing members or brasses 40, which are fitted into the bore of the member 41, forming part of the shell or case 8. The brasses 40 are prevented from moving apart as by the shoulder 42 of the pinion 38, and the nut 43 threaded upon the shaft 39, while the brasses are restrained from approaching each other by the flanges 44 engaging the member 41, and thus the pinion 38 is held in its proper relation to the gears 15 and may be driven thereby. The member 41 has the levers 45 pivotally attached thereto as by the bolts 46, said levers having their arms positioned between the lugs 47, forming part of the member 41, in such manner that within certain limits the levers are free to swing upon the bolts 46 and are then restrained by the lugs 47, or preferably by elastic means, as for example, compression springs 48 carried within the lugs as shown in Fig. 7. The extremities of the levers 45 are provided with a round portion 49, which is passed through the bore of the member 50 and held in place therein as by the nut 51. The member 50 is free to revolve upon the portion 49 and is provided with a lug 52 having a transverse bore as indicated in Fig. 7. Through this bore is passed a bolt 58 carrying two parallel links 59 upon opposite sides of the member 51. The upper portions of the said links are perforated and bolts 53 passing through a bore in the members 54 connect the links therewith. The members 54 are carried by the studs 55 passing therethrough and forming part of the yoke 56 carried upon a stud 57, forming part of the bracket 68 attached to the end sill 69 of the car truck. It will be obvious that this link and yoke connection will restrain the gear casing from revolving with the axle but will permit motion within reasonable limits in any direction to be met with in practice as the car truck plays upon its springs, or as the axle changes its relation with regard to the sills of the truck, due to play in various directions. The end of the shaft 39 is coupled to a universal joint as indicated at 60, which universal joint is connected with the shaft 61, having a keyed connection with the sleeve 62 in such manner that the sleeve revolves with the shaft but is free to move laterally thereupon. The sleeve 62 is connected with the universal joint 63 carried by the shaft 64 of the generator 65 which is fastened to the car body as indicated at 66. Dust guards 67 are preferably placed as indicated in Fig. 1 to prevent dust from entering the journals.

An operation of my invention is substantially as follows:—If the car be moving, the axle 1 will revolve and rotate the sleeve 3 cast thereupon and also the split sleeve or bearing member 4 clamped upon the trued cast sleeve 3. The sleeve 4 will revolve freely within the bearings or brasses 6 and the bearing surfaces 5 will be lubricated as by means of the oil soaked packing carried in the cavities 12. The casing 8 will be held from revolving with the axle by means of the levers 45 and their link connections with the yoke 56 pivotally attached as by 57 to the brackets 68 carried by the end sill or fixed point of support 69 of the truck. However, as the axle 1 changes its position with regards to the end sill 69, the various alterations in the relative positions of these members to be met in practice will be allowed by the link connections in an obvious manner while sudden shocks will be taken up by the springs 48. The gear 15 will, through the instrumentality of the pins 19, be caused to revolve with the split member 4, and if the yoke 25 be in the position shown in the drawing, the pins 23 will be forced into the positions indicated in the cam slots 24 and so hold the ring 21 within the annular recess 20 of the gear 15, that the said gear will be held against the flange 18 and will mesh with the bevel pinion 38 and, therefore, the pinion 38 will be driven by the gear 15 and in turn will drive the shaft 39 properly supported by the bearings or brasses 40 which may be lubricated by means of oil soaked waste or packing carried within the oil cavities 70. Revolution of the shaft 39 connected as by the universal joint 63 will cause the armature shaft 64 of the generator 65 to revolve therewith. It will be noted that the center of the shaft 39 is preferably below the center of the driving axle 1, in order that the shaft 61 may readily clear the end sill 69, and on this account the gearing 15 and 38 are made of the skew bevel type, and it will also be noted that the universal joints 60 and 63 will allow the pinion shaft 39 and the generator shaft 64 to have their relative positions changed, owing to various movements of the car axle 1 in practice in any direction with the exception of approaching or receding from each other, and motion in this direction is permitted by the sleeve and key connection between the shaft 61 and the sleeve 62, while such connection, of course, transmits rotary motion even though telescoping to allow elongation or shortening of the distance between the universal joints. With the yoke 25 in the positions shown in the drawings and the gear 15 meshed with the pinion 38, it will be noted that the thrust upon the gear 15 is in such direction as to tend to move the same away from the flange 18 and out of mesh with the pinion 38 and that this thrust has to be restrained from throwing the gears out of mesh by the pins 23 engaging the cam slots 24 of the yoke 25, and the slots are so shaped that when the gears are properly in mesh a diameter in the direction of the thrust of the pins 23 is normal to that portion of the slot receiving the thrust and, therefore, the direction of pressure withstood by the yoke is in the direction of the gear thrust and not applied to the slots in such manner as to tend to produce revolution either of the ring 21 or the yoke. If it be desired to throw the driving gear out of action, as for example, in case of a broken tooth in either of the gears or trouble with the bearings of the pinion shaft, or for any other such reason, the handle 35 may be forced out of the jaws 37 upon its hinge and revolved four times in a right-handed direction, which will cause the right-handed screw 31 to move the yoke 25 until the boss 29 is in contact with the nut 71, and the screw 31 is accurately cut so that when these members abut the handle 35 may be again pressed into the jaws 37 and hold the yoke in this position. This movement of the yoke 25 will cause the pins 23 to travel along the slots 24 until they reach the opposite ends of the said slots and this motion of the pins 23 will cause the ring 21 to move the gear 15 in a lateral direction and draw the teeth of the same out of mesh with the pinion 38 and thus suppress all engagement between the axle and the generator. If desired to again establish connection between the axle and the generator, the gears may readily be meshed by releasing the handle 35 of the jaws 37 and giving the same four turns in a left-handed direction when the handle may be again locked in the jaws 37 and the yoke 25 will be in the position shown in the drawing and the gears 15 and 38 will be properly meshed. This means whereby the driving connection between the pinion and the axle may be broken is a very important feature in service in this type of equipment wherein the generator is driven by a positive gear connection with the car axle, for when the car is standing still, it allows one to operate the generator as a motor running upon the storage battery usually present in this type of equipment. Thus, the generator and the driving mechanism may be tested in motion with the car standing still and their operation observed and any repairs that are necessarily made may be tested in motion, which would otherwise be impossible, for, with a fixed connection the car would have to travel in order for the generator to run even as a motor, and with a car moving there is no opportunity of observing the operation of a driving gear attached to the truck and located on the under side of a car.

I do not wish in any way to limit myself to any of the exact details of construction nor to the exact mode of operation as set forth in this specification to illustrate one embodiment of my invention, for it will be obvious that wide departure may be made in the way of details and construction without departing from the spirit and scope of my invention, which is as set forth in the following claims. Nor do I wish to be limited as to the use of my invention, as obviously it is capable of use generally in machines where it is desired to transmit power in either direction by such mechanism, although my invention is specifically designed for use in connection with cars and other moving vehicles where the power is transmitted from the axle of one of the cars to and through mechanism connected to the other end of the gearing, which mechanism may be used to utilize power in various ways or may be used in a reverse direction for the purpose of transmitting power reversely, and to this end I desire it understood that my invention is generic.

I claim—

1. A mechanism for the transmission of power embracing a plurality of rotatable shafts and interconnecting gearing carried thereby; a gear casing journaled at one end upon one of said shafts; means independent of said shafts for movably sustaining the casing at the other end from a fixed point of support whereby said casing may adjust itself with respect to said point when moved by one of said shafts; and means carried by the shaft bearing the gear casing for effecting the connection or disconnection of said gearing.

2. A mechanism for the transmission of power comprising two rotatable shafts; interconnecting gearing on said shafts; means journaled on one of said shafts for pivotally supporting the mechanism at one end; means carried by the same shaft for connecting and disconnecting the gearing; and means for movably securing the supporting means at its other end to a fixed point whereby the supporting means can adjust itself with respect to said point when moved by the last-named shaft relatively to said point, said securing means being independent of the shafts.

3. A mechanism for the transmission of power embracing a rotatable shaft and a gear casing journaled thereon; a gear wheel carried by said shaft; a second shaft and a pinion thereon to mesh with the gear wheel; means for placing the gear wheel into and out of mesh with the pinion; and means independent of said shafts for movably securing the casing to a fixed point of support whereby the casing can adjust itself with respect to the support when moved by the first shaft relatively to said support.

4. A mechanism for the transmission of power embracing a rotatable shaft; a gear casing journaled thereon; a gear wheel carried by the shaft; a second shaft carried by the gear casing; a pinion on the second shaft meshing with the gear wheel; means for putting the gear wheel into and out of mesh with the pinion; and means independent of both shafts for movably connecting the casing to a fixed point of support at one side of the first shaft whereby the casing can adjust itself with respect to the support when moved by the first shaft relatively to said point.

5. A mechanism for the transmission of power embracing a rotatable shaft and a gear casing journaled thereon; a gear wheel carried by said shaft; a second shaft carried by the casing; a pinion on the second shaft to mesh with the gear wheel; means inclosed within the gearing casing and carried by the first-named shaft for placing the gear wheel into and out of mesh with the pinion; and means independent of said shafts for movably securing the casing and its inclosing gearing to a fixed point of support whereby the casing can adjust itself with respect to the support when moved by the first shaft relatively to said point.

6. A mechanism for the transmission of power for use with movable vehicles embracing a rotatable propelling shaft; a gear thereon; a gear casing journaled upon the shaft; a second shaft carried by the casing; a pinion on the second shaft to mesh with the gearing; means for connecting and disconnecting said gearing; means for movably securing the casing to a fixed point of support whereby the casing can adjust itself with respect to said point when moved by the first shaft relatively to said point; and a third shaft carried by the vehicle and universally connected to the second shaft.

7. A mechanism for the transmission of power for use with movable vehicles embracing a rotatable propelling shaft; gearing carried thereby; a casing for the gearing journaled upon said shaft; a second shaft carried by the casing; a pinion thereon to mesh with the gearing; means carried by the propelling shaft with the gearing for connecting and disconnecting the gearing and pinion; means for pivotally securing the gear casing to a fixed point of support on the vehicle whereby the casing can adjust itself in response to relative movements of the third shaft and the vehicle; and a third shaft carried by the vehicle universally connected to the second shaft.

8. A mechanism for the transmission of power comprising a pair of shafts; gear wheels to mesh with each other carried by the shafts, one of said gear wheels being mounted to slide upon one of said shafts and forced to rotate therewith; said gear wheel having a ring rotatably secured thereto, said ring having a projection; a casing for said gear wheels; a yoke slidably mounted in the casing and having its arms embracing the shaft of said last-named gear wheel, one of the arms of the yoke having a cam slot for receiving the projection on the ring; and means for reciprocating the yoke whereby the last-named gear wheel can be moved into and out of mesh with the other gear wheel.

9. A mechanism for the transmission of power for use with movable vehicles embracing a rotatable shaft; a gear slidably mounted thereon but forced to rotate therewith; a casing encircling the gear; a second shaft carried by the casing; a pinion on the second shaft to mesh with the gear, said gear having a ring rotatably secured thereto, the ring having a projection; a yoke slidably mounted in the casing having its arms arranged to receive the first shaft, one of said arms having a cam slot therein for receiving the projection on the ring; means for reciprocating the yoke to move the gear into and out of mesh with the pinion; means on the outside of the casing to lock said means to hold the gear in connecting or disconnecting relation; means independent of said shafts for movably securing the gear casing to a fixed point of support on the vehicle whereby the casing can adjust itself in response to relative movements of the first shaft and the vehicle; and a third shaft carried by the vehicle and universally connected to the second shaft.

WILLIAM S. EVANS.

Witnesses:
MAXWELL GREENBERGER,
ELMER E. ALLBEE.

Copies of this patent may be obtained for five cents each, by addressing the "Commissioner of Patents, Washington, D. C."